United States Patent [19]
Prandy et al.

[11] Patent Number: 5,225,265
[45] Date of Patent: Jul. 6, 1993

[54] ENVIRONMENTALLY DURABLE LIGHTNING STRIKE PROTECTION MATERIALS FOR COMPOSITE STRUCTURES

[75] Inventors: Jill M. Prandy, Irvine; Hermann Sitt, Brea, both of Calif.

[73] Assignee: BASF Aktiengesellschaft, Ludwigshafen, Fed. Rep. of Germany

[21] Appl. No.: 805,725

[22] Filed: Dec. 6, 1991

[51] Int. Cl.$^5$ .................... B32B 7/00; D03D 9/00
[52] U.S. Cl. .................... 428/138; 428/256; 428/247; 361/117; 361/218; 244/1 A
[58] Field of Search ............... 244/1 A; 361/117, 218; 428/256, 138

[56] References Cited

U.S. PATENT DOCUMENTS

| | | | |
|---|---|---|---|
| 3,755,713 | 8/1973 | Paszkowski | 361/218 |
| 3,989,984 | 11/1976 | Amason et al. | 361/212 |
| 4,755,904 | 7/1988 | Brick | 361/117 |

Primary Examiner—George F. Lesmes
Assistant Examiner—Chris Raimund
Attorney, Agent, or Firm—William G. Conger

[57] ABSTRACT

Composite assemblies prepared from thermosettable matrix resin-impregnated fiber-reinforced prepregs, conductive metal screens, and film adhesives are provided which do not develop microcracks after extensive thermal cycling. The composite assemblies are particularly useful in the manufacture of vehicles in the transportation industry, especially aircraft.

5 Claims, 7 Drawing Sheets

ENVIRONMENTALLY DURABLE LIGHTNING STRIKE PROTECTION MATERIALS FOR COMPOSITE STRUCTURES

BACKGROUND OF THE INVENTION

1. Field of the Invention

The subject invention pertains to environmentally durable lightning strike protection materials for use in composite structures, particularly aircraft. More particularly, the subject invention pertains to lightning strike materials which not only provide lightning strike protection, but which maintain this protection even after severe repetitive thermal cycling and exposure to corrosive atmospheres.

2. Description of Related Art

The desirability of protection of structures from lightning dates at least to medieval times, and lightning rods and the use of heavy copper cables to ground radio and television antennas is well known. However, many modern structures are incapable of using grounding as a method of channeling away the intense electrical energy from a lightning strike. Aircraft, for example, must rely on the ability to rapidly dissipate such energy by rapidly distributing it throughout the structure.

In the past, aircraft, automobiles, and other metal structures provided a low resistance pathway throughout the bulk of the structure as a means of energy dissipation. However, the use of composite materials, such as thermosetting and thermoplastic polymer impregnated fiber reinforcement has created problems in this respect due to the much lower electrical conductivity of such materials. Carbon/graphite fiber reinforced materials, while offering higher conductivity than their fiberglass or high temperature thermoplastic reinforced analogues, are still deficient in this respect. Moreover, at surfaces where composite parts are joined together, the electrical resistance is often extremely high.

To compensate for these deficiencies of modern fiber reinforced structural materials, designers have sought to incorporate conductive pathways of metal throughout or along the surfaces of the structure in order to provide a means of rapidly dissipating the energy received in a lightning strike. The performance of such strategies may be assessed by exposing the protected structure to high energy electrical discharges. Several such tests are required for many applications. These tests are more fully described infra.

Many methods now presently exist to provide adequate lightning strike protection. However, commercially acceptable methods must be of relatively low cost, lightweight, and durable. With respect to the latter quality, since aircraft often operate in moist salty air environments or are subject to salt spray, corrosion of the lightning strike conductors can cause a loss of protective ability, and can also lower the strength of the composite structure itself.

The use of metal screens has been proposed for use as lightning strike protective materials. Such screens may be prepared by several methods. Expanded metal screens, for example, may be prepared by slitting metal sheet in a geometric pattern followed by stretching the sheets in a direction transverse to the slit orientation. Suitable screens may also be prepared by chemically etching holes in metal foils, by perforating metal foils using high energy electromagnetic beams, for example laser beams, by use of plasma beams, etc. Screens may also be formed by weaving metal filaments into a gauze-like structure.

By whatever method the screen is formed, it must be of sufficient conductivity to dissipate electrical energy, but must be of sufficient lightness to avoid excessive weight, particularly in military and commercial aircraft. Moreover, to avoid corrosion, the screen must be completely encased in a non-porous covering which is further not susceptible to microcracking which could allow for penetration of compositions which may promote corrosion.

Previous methods of providing for lightning strike protection included the bonding of a metal screen, such as those described previously, to the substrate for which protection is desired, by means of a film adhesive, either as a neat film or supported by a thin ply of fabric (scrim) such as lightweight polyester. The composite structure, screen, and adhesive are then co-cured. Unfortunately, such assemblies, upon cure, failed to provide complete coverage of the screen or were not durable, developing multitudinous microcracks after only a limited amount of thermal cycling. Such attempts also failed to provide the requisite amount of corrosion resistance.

OBJECTS OF THE INVENTION

An object of the subject invention is to provide improved lightning strike protection materials. A further object of the invention is to provide lightning strike protection materials which are light in weight, which are not susceptible to development of microcracking and which are environmentally durable.

SUMMARY OF THE INVENTION

It has now been surprisingly discovered that the generation of microcracks in lightning strike protected composites is related to the presence of pockets of hard prepreg matrix resin within the adhesive layer. Assemblies which exhibit few or none of such hard resin pockets do not develop appreciable microcracks upon thermal cycling, are more corrosion resistant, and are cosmetically of higher apparent surface quality. It has further been surprisingly discovered that the presence of such hard resin pockets may be eliminated through selection of an adhesive whose minimum viscosity and dwell time at minimum viscosity bears a certain relationship to the prepreg matrix resin minimum viscosity and dwell time at minimum viscosity.

DESCRIPTION OF THE PREFERRED EMBODIMENTS

The composite structures which form the substrate to which the lightning strike protective materials of the subject application are applied are prepared by laying up one or more, generally eight or more plys, of thermosettable matrix-resin impregnated fiber reinforcement onto which a conductive metal screen is placed and onto which the lightning strike adhesive of the subject invention is then laid. The assembly is then heated to a temperature sufficient to co-cure both the thermosetting matrix resin and the thermosetting adhesive, generally under modest pressure.

The thermosettable resin-impregnated fiber-reinforced prepregs may contain a number of different types of matrix resin systems, including but not limited to bismaleimides and the related nadicimides, epoxy, and cyanate resins.

Examples of suitable bismaleimides resin systems include those disclosed in U.S. Pat. No. 4,100,140. In addition to the maleimide or nadicimide monomers, comonomers such as diallylbisphenol A or diisopropenylbisphenol A are generally added to increase toughness of the matrix resin. Further increases of toughness may be achieved through dissolution of soluble engineering thermoplastics such as the polysulfones, polyethersulfones, polyimides, polyetherimides, and the like. Such thermoplastics may also serve as viscosity modifiers of the matrix resin, generally increasing both the room temperature viscosity as well as the minimum viscosity which occurs during cure.

Differentially soluble particulate thermoplastics may also be utilized. Such thermoplastics must be selected in concert with the solvent character and mix temperature of the matrix resin, and should not be appreciably soluble at the resin mix temperature but be completely or virtually completely soluble in the matrix resin upon cure. Large quantities of particulate thermoplastics as is the case with soluble thermoplastics, may dissolve but then phase out during cure to form a multiphase sometimes interpenetrating cured matrix.

Also useful are particulate thermoplastics which upon cure are found not to have been completely dissolved, but swollen and strongly adhered to the continuous matrix resin. In the case of the bismaleimide resins in which diallylbisphenol A is used as a comonomer, a thermoplastic polyimide designated as Lenzing 2080 has been found to be highly suitable.

Also useful to increase toughness are low $T_g$, <10° C., particulate elastomers such as functionalized, lightly crosslinked styrene/butadiene rubbers. Higher $T_g$ elastomeric particles may also work in some situations. In conjunction with such elastomeric particles, soluble thermoplastics are also advantageously utilized.

Epoxy matrix resins may also be utilized. Such resin systems generally include aromatic amine curing agents such as 4,4'-diaminodiphenylsulfone and in some cases, reactive aromatic oligomers such as amine or hydroxyl terminated polysulfones, polyethersulfones, and the like, the latter group of oligomers generally having molecular weights in the range of 700 to 15,000, more preferably 2000 to 10,000. The methods of toughening bismaleimide resin systems may also be used with epoxy resins. Generally, Lenzing 2080 is not effective as a particulate thermoplastic toughener with epoxy systems, although MATRIMID® 5218 thermoplastic polyimide; and polysulfones, especially amorphous polysulfones are well suited for this application. Suitable epoxy resin formulations may be found in U.S. Pat. Nos. 4,539,253; 4,863,787; 4,656,207; and 4,608,404, which are herein incorporated by reference.

Cyanate resin systems are also well known, as exemplified by U.S. Pat. No. 4,644,039 which is herein incorporated by reference. Generally speaking, the same methods of toughening described above also apply to cyanate resins.

Mixtures of base resin system monomers have also proven effective as thermosettable matrix resins. Examples are mixtures of bismaleimide and cyanate monomers. Addition of minor amounts of low viscosity epoxy resins to bismaleimide resin systems has also proven effective in formulating a tough, high temperature service resin system.

The fibrous reinforcement utilized may include high temperature thermoplastics such as the fully imidized polyimides, high molecular weight polysulfones, polyethersulfones, polyetherketone, polyetherketoneketone and like ether-ketone variants, high temperature polyolefins such as SPECTRA® polyolefin fibers, polybenzimidazoles, and the like; but preferably includes inorganic fibers such as glass, quartz, carbon/graphite, boron nitride, silicon carbide, and ceramic fibers. The fibrous reinforcement may be in the form of unidirectional tape, woven fabric, random continuous or chopped mat, or other form known to those skilled in the art of fiber-reinforced prepregs, and generally are impregnated with from 10 to 70 weight percent, more preferably 20 to 50 weight percent of the thermosettable matrix resin.

The metal screens useful to provide lightning strike protection are preferably of from 1 to about 10 mils in thickness, more preferably from 2 to about 6 mils in thickness, and most preferably from 3 to 5 mils in thickness. These screens preferably have a weight of from 0.014 to 0.04 pounds per square foot. Such screens may be of expanded metal, etched or perforated metal, or woven gauze-like material as explained previously. Preferably, screens are made of a high conductivity, corrosion resistant metal such as silver, nickel, titanium, aluminum, or copper. Aluminum and copper screens are preferred. The metal screens may be stress relieved through annealing, and in the case of some metals, particularly aluminum, may be anodized to alter physical characteristics or increase corrosion resistance. The screens may also be coated with a chromate-based or other corrosion resistant coating or primer. Such screens are commercially available, for example from Delker and Astrostrike.

The adhesive selected for bonding the metal screen to the substrate and preferably also providing a protective surface layer must meet certain exacting requirements and will vary depending upon the prepreg matrix resin. If the requirements are not met, prepreg matrix resin will flow into the adhesive layer forming hard pockets of resin which may often be seen on the surface of the part as apparent surface imperfections, and which form a nucleus for the development of microcracks.

The formation of such hard pockets of prepreg matrix resin has been unexpectedly determined to be related to the minimum viscosities and dwell times at minimum viscosity of the prepreg matrix resin and adhesive resin.

In general, to avoid hard pockets of resin, the adhesive dwell time at minimum viscosity $T_a$ and adhesive minimum viscosity $V_a$ must meet the relationship:

$$T_a^{1.5}V_a < 0.3;$$

and when greater than about 0.3, then the prepreg matrix resin minimum viscosity $V_p$; the prepreg resin dwell time at minimum viscosity $T_p$; the adhesive minimum viscosity $V_a$; and the adhesive resin dwell time at minimum viscosity $T_a$; must be related to a diffusion coefficient D by the following equation:

$$D < [T_a]^{1.5}/V_a \cdot [T_p/V_p]$$

wherein D has a value of 0.1.

Figure 1:
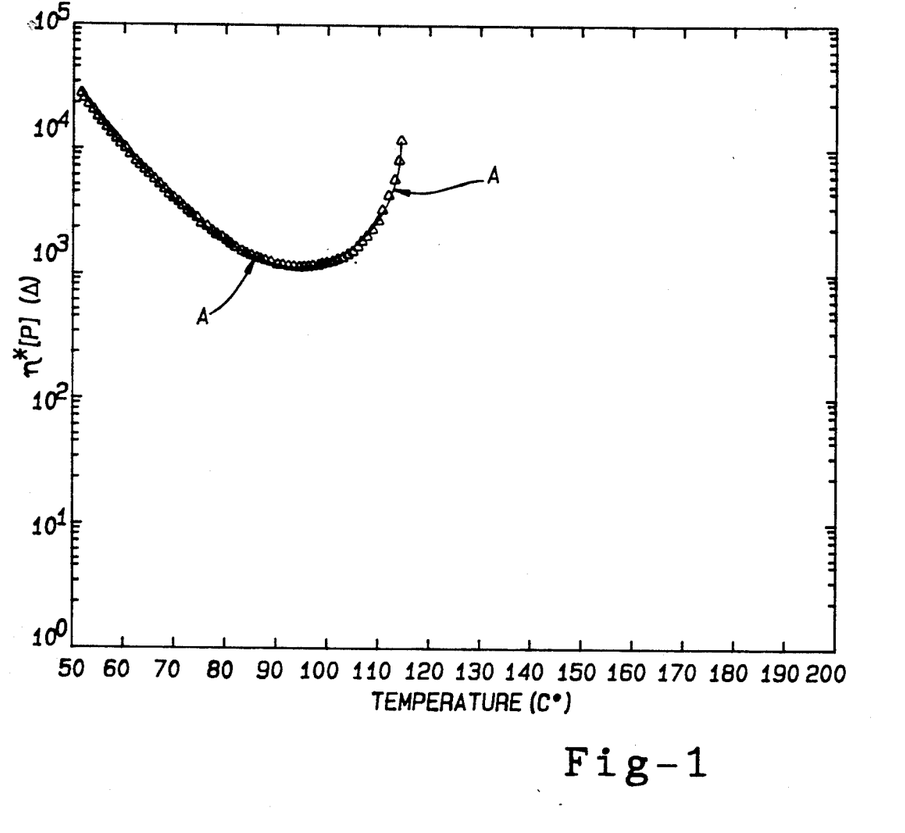
FIG. 1 is a viscosity profile of a film adhesive suitable for use in the subject invention measured over a temperature ramp of 1° C./min.

By "dwell time at minimum viscosity" is meant the time at which the particular resin remains between the minimum viscosity and three times the minimum viscosity at the particular temperature ramp at which the composite part is co-cured with the adhesive. With reference to FIG. 1, for example, a typical plot of a film adhesive versus temperature is shown. The temperature was ramped at the rate of 1° C./minute. This adhesive exhibited a room temperature viscosity of approximately 35,000 poise, and a minimum viscosity of approximately 1200 poise. Points A and B on the viscosity/temperature profile represent three times the minimum viscosity. The dwell time at minimum viscosity is the time span from A to B which in this case is approximately 40 minutes.

Figure 2:
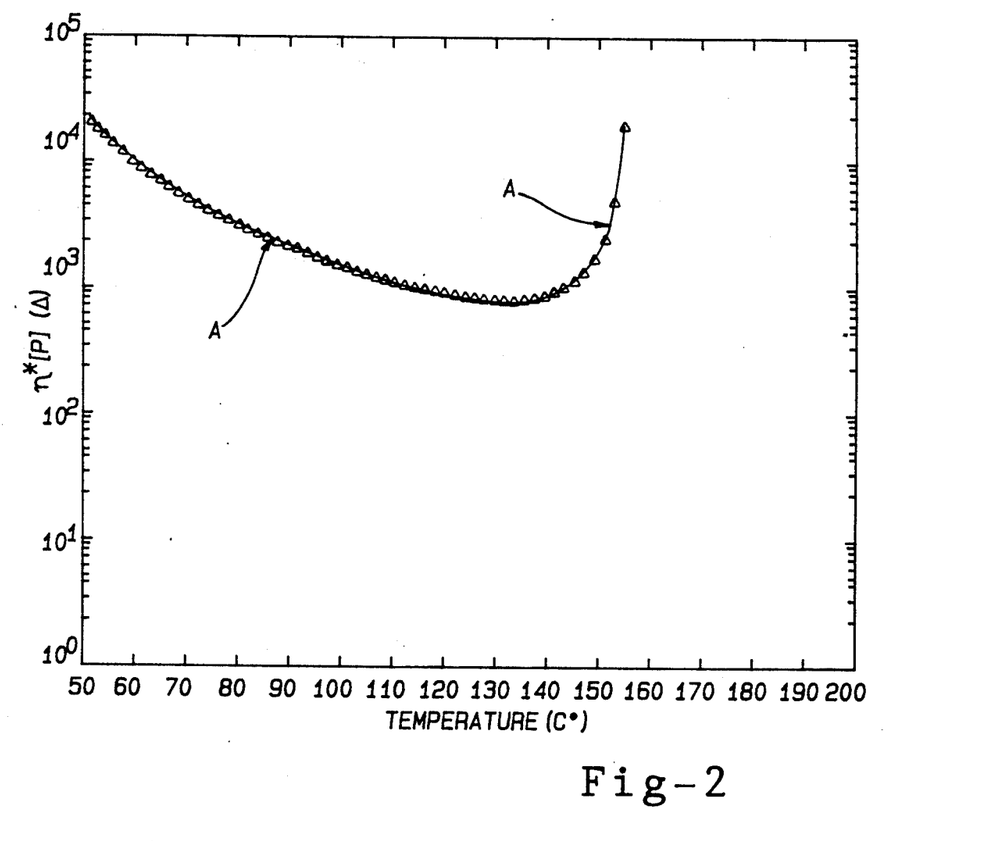
FIG. 2 is a viscosity profile of a film adhesive having a longer dwell time and lower viscosity than the film adhesive of FIG. 1, the viscosity profile measured over a temperature ramp of 1° C./min.

FIG. 2 illustrates the viscosity profile of an adhesive with lower minimum viscosity and longer dwell time than that of FIG. 1. The minimum viscosity is approximately 600 poise, and the dwell time at minimum viscosity is approximately 65 minutes.

Figure 3:
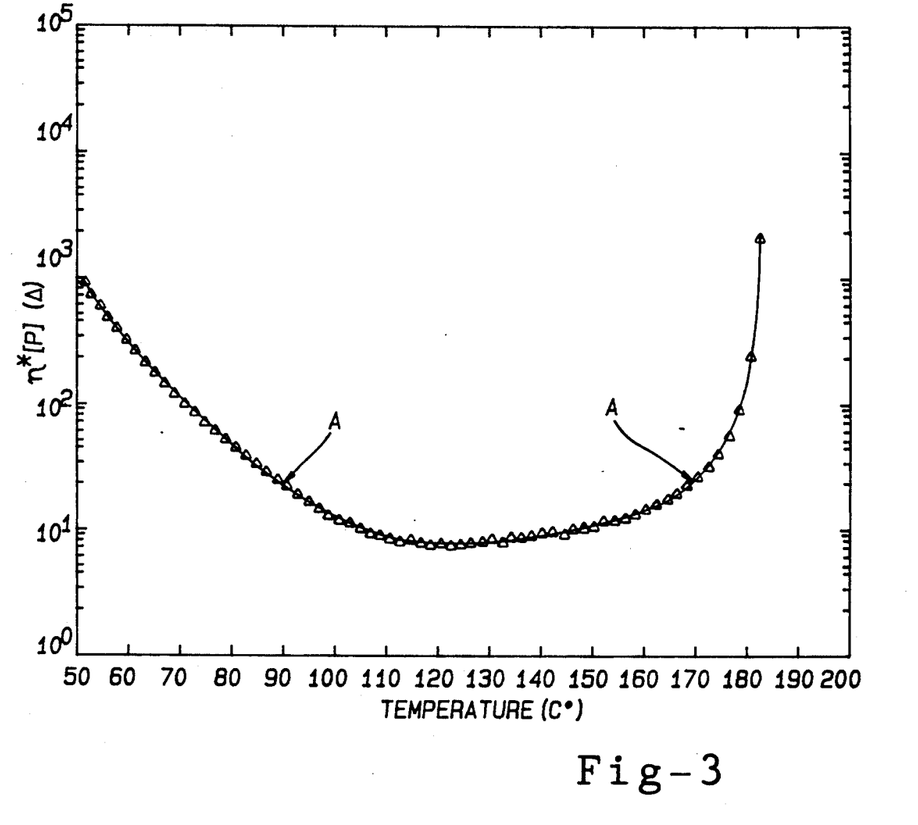
FIG. 3 is a viscosity profile of a low minimum viscosity prepreg matrix resin measured over a temperature ramp of 2° C./min.

FIG. 3 illustrates a typical viscosity/temperature profile for a prepreg matrix resin which has a low minimum viscosity (5-6 poise), and a long dwell time (~38 minutes). If a metal screen is adhered to a composite prepared from fiber-reinforced prepregs containing this matrix resin and an adhesive having the minimum viscosity and dwell time of the adhesive of FIG. 2, a poor product will form which will have numerous hard resin pockets, a less than desirable appearance, which is subject to microcracking upon thermal cycling, and which will exhibit less than the desired corrosion resistance. If, on the other hand, the adhesive of FIG. 1 is utilized, a superior part with no hard resin pockets, good surface appearance, great resistance to microcracking, and superior corrosion resistance will result.

The film adhesive should be physically and chemically compatible with the prepreg matrix resin. Assessing such compatibility is a task well known to those skilled in the art of fiber-reinforced prepregs and structural thermosetting adhesives. Compatibility is initially assessed by traditional methods of assessing adhesive performance such as bond strength on the desired substrate as measured by lap shear and Bell peel strength as measured by standard ASTM test protocols. However in the case of the present application, a further requirement is the substantial absence of hard resin pockets within the adhesive layer, resistance to microcracking upon thermal cycling, and complete coverage of the embedded metal screen.

In general, the chemical makeup of the adhesive is similar to that of the prepreg matrix resin. In other words, epoxy based adhesives are commonly used with epoxy matrix resin adherents while bismaleimide adhesive resins may be used with bismaleimide-based matrix resin adherents. However, in many applications, the adhesive may be chemically different from that of the prepreg matrix resin providing that suitable adhesive characteristics are achieved. Thus epoxy adhesives may be useful in certain applications with bismaleimide or cyanate matrix resin prepregs while cyanate based adhesives may be useful with epoxy and bismaleimide matrix resin prepregs.

The adhesive minimum viscosity during cure is preferably greater than 600 poise, more preferably greater than 800 poise, and most preferably 1000 poise or more. The minimum dwell time at minimum viscosity varies directly with the adhesive minimum viscosity. Thus a 900–1000 poise minimum viscosity adhesive has a dwell time at minimum viscosity preferably less than 45 minutes when measured with a cure ramp of 1° C./minute, while a lower viscosity resin, for example one having a minimum viscosity of 600 poise, should have a dwell time at minimum viscosity of 32 minutes or less, preferably less than 25 minutes. Even lower viscosity adhesives may be used if the dwell time is reduced proportionately. However, too great a reduction in dwell time may result in loss of adhesion to the matrix resin, accompanied with loss of tensile, shear, or peel strength.

As stated herein, the relationship of adhesive minimum viscosity and dwell time at minimum viscosity are not the only factors which must be assessed in selecting a suitable adhesive, because matrix resin minimum viscosity and dwell time at minimum viscosity also affect suitability of an particular adhesive. With prepreg matrix resins having low viscosity and long dwell time in particular, the choice of adhesive is limited to those of higher viscosity and shorter dwell time as indicated by the diffusion coefficient D, defined as $$D < [T_a]^{1.5}/V_a \cdot [T_p/V_i]$$

where $D < 0.1$.

It has been found that adhesives with minimum viscosities above about 800 poise and dwell times of less than 40 minutes will work irrespective of the matrix resin viscosity and dwell time of any practical, commercial matrix resin because the above relationship will always be satisfied, provided of course that other physical parameters such as tensile strength, lap shear, and peel strength are also met.

To select other adhesives, the minimum viscosity and dwell time at minimum viscosity of both the adhesive resin and prepreg matrix resin is measured by conventional methods, for example by utilizing a Rherometrics dynamic analyzer using the parallel plate method with a 10 rad/sec frequent and a 1°–2° C./minute heating rate. Such tests are well known in the industry. The dwell times expressed above are of course related to the temperature ramp and can be expected to be shorter when faster ramping is utilized. Most measurements are conducted at ramps of from 0.5° C./min. to 5° C./min., preferably 1.0° C./min. to 2.0° C./min. Curing composite parts at high ramp rates may lead to distortion of the part generated by temperature differentials created between the surface and interior.

The preferred film adhesive for epoxy matrix resin prepregs is a dicyandiamide cured epoxy resin adhesive containing liquid acrylonitrile/butadiene rubber, having a room temperature viscosity of approximately 35,000 poise and a minimum viscosity measured during a 1° C./minute cure ramp of approximately 1000 poise, designated METLBOND ® 1515-3 structural adhesive available from BASF Structural Materials, Incorporated, Anaheim, Calif.

It has further been discovered that the thickness of the film adhesive is important in determining the ultimate properties of the lightning strike/film adhesive combination. In particular, the film adhesive should be minimally 1.2 times the screen thickness. Thus for a 4 mil thick screen a 5 mil adhesive film will be sufficient, although a 6 mil film is preferable. Most preferably, the film adhesive will have a thickness no more than 1.5 to 2.0 times the screen thickness, or an undesirable weight and cost penalty will result. It has further been discovered that use of lower viscosity prepreg resins with minimum viscosities as low as 400 poise may be used if the amount of adhesive is increased such that the cured thickness is at least about 1.2 times the screen thickness while at the same time, the areal uncured fill weight is 0.05 lb/ft$^2$ or greater.

Ability to withstand lightning strike is assessed by subjecting composite panels to electrical discharge. The test methods are described in the report of the Society of Aeronautical Engineers AE4L Committee entitled "Lightning Test Waveforms and Techniques for Aerospace Vehicles and Hardware," Jun. 20, 1978; and MIL-STD-1757A "Lightning Qualification Test Techniques for Aerospace Vehicles and Hardware", Jul. 20, 1983.

Figure 4A:
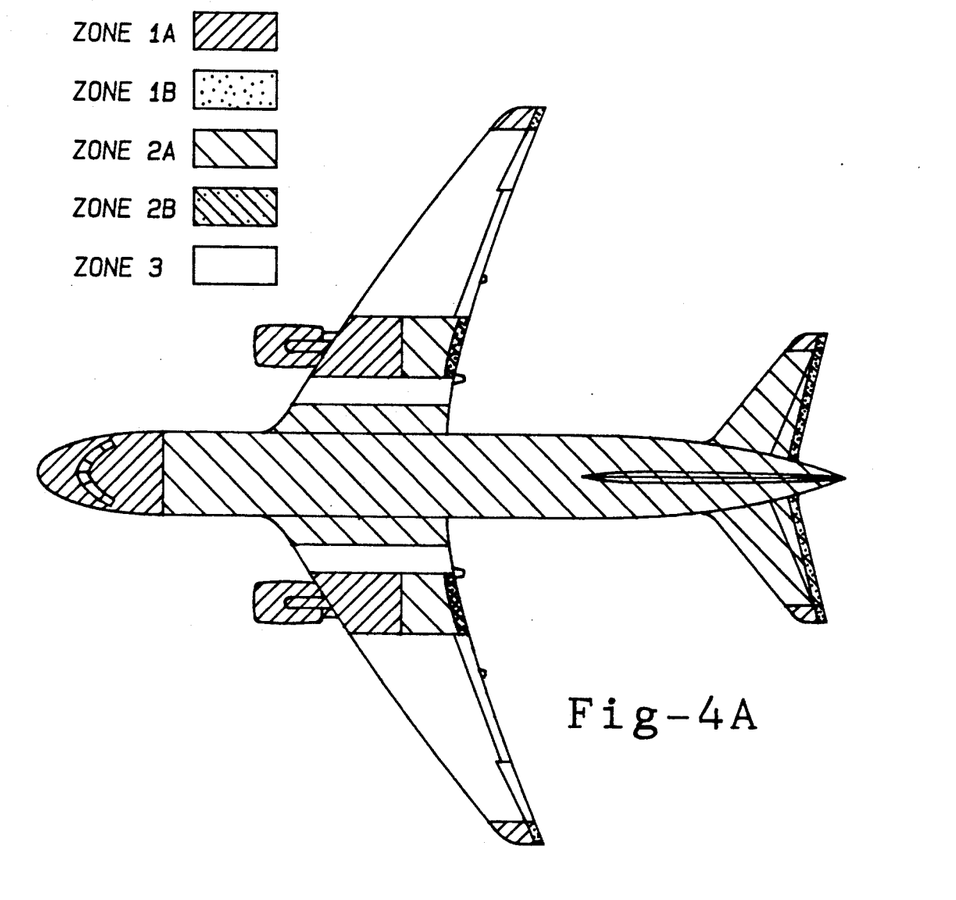
FIGS. 4A and 4B illustrate the lightning protection commonly required of commercial aircraft.
Figure 4B:
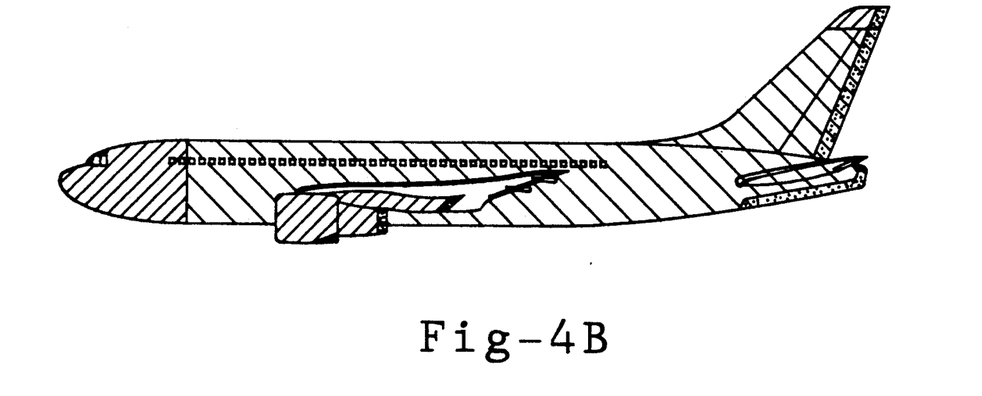
Figure 5:
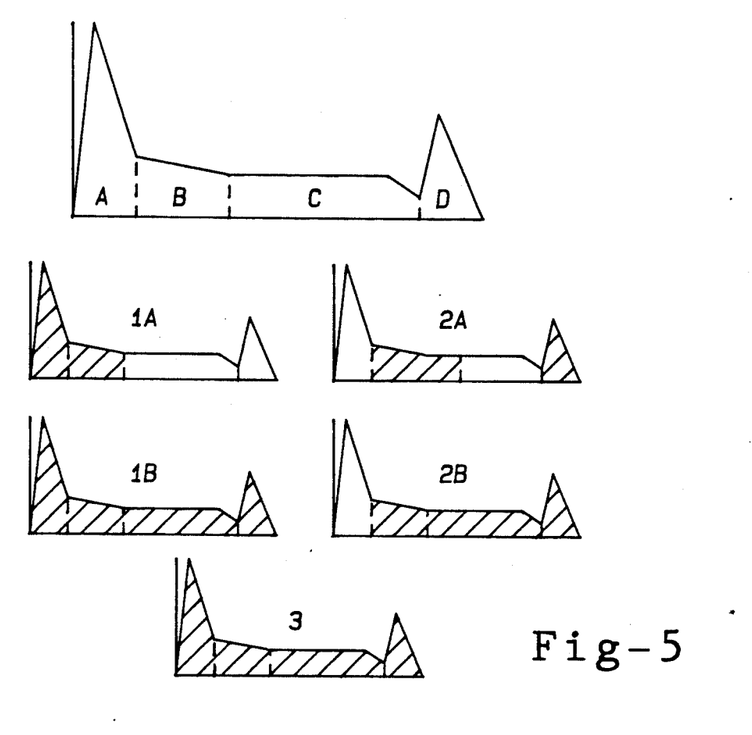
FIG. 5 illustrates the various current/time zones used in assessing lightning strike resistance.

Portions of aircraft structure are considered to have differing need to withstand lightning strike, and these requirements are the so-called zone 1A, zone 1B, zone 2A, zone 2B, and zone 3 strike zones. FIG. 4 illustrates which strike zones a commercial aircraft must generally meet. FIG. 5 illustrates the electrical components of the various strike zone tests. The lightning strike model consists of four components of electrical discharge over certain time periods labeled A, B, C, and D. Component A represents a first return stroke having a current of 200,000 amps over a time period of less than 500 μsec; Component B an intermediate current of 2000 amps for less than 0.5 seconds; Component C a continuing current of from 200-800 amps of from 0.25 to 1 second; and Component D a restrike of 100,000 amps for less than 500 μsec.

Test panels to assess lightning strike performance consisted of three plies of graphite/epoxy fabric with the particular screen/adhesive combination attached. Requirement for passing is no puncture (thru-penetration) of the three fabric plies. For some applications, these requirements may be different.

The invention will no be illustrated by the following examples which should not be construed as limiting the scope of the invention in any respect.

Composite panels 12×12 inches were used for zone 2A tests. Composite panels 24×24 inches were used for zone 1A tests. The test panels were clamped within a special fixture to allow currents to enter the composite material at the strike point and flow through the material to two opposite edges. Currents then returned to generator ground through wire braid.

A high current electrode was centered above the panel surface at a one inch air gap distance. Nonconductive potting material on the tip of the electrode forced the arc to discharge from the side of the electrode which minimized the downward mechanical force which is not representative of a natural discharge.

Zone 2A strikes were applied to the 12×12 inch panels and zone 1A strikes to the 24×24 inch panels. Current components D, B, and C were applied for zone 2A and components A and B for zone 1A. The current components are defined as follows:

Component A:
  Peak current amplitude $(I_P)$=200 kA±10%
  Action integral (AI)=2.00×10$^6$ A$^2$s±20%
Component B:
  Average current amplitude=2 kA±10%
  Maximum charge transfer=10 coulombs±20%
Component C:
  Average current amplitude $(I_{av})$=200-800 A
  Charge transfer=200 coulombs±20%
Component D:
  Peak current amplitude $(I_P)$=100 Ka±10%
  Action integral (AI)=0.25×10$^6$ A$^2$s±20%

Components A, B and D were generated by capacitor banks which were discharged through series impedance into the test article. Component C was generated by the partial discharge of a dc battery bank with the discharge duration controlled by an in-line utility distribution cutout fuse.

Component A and D waveforms were measured by a wide band impulse current transformer and Components B and C by precision shunt resistors. All waveforms were recorded on Polaroid film from oscilloscope displays. For zone 2A tests, Component C is modified for the expected dwell time on the aircraft. When dwell time is unknown, an average current of 400 amperes for 45 milliseconds is assumed resulting in a charge transfer of 18 coulombs (400 amps×45 ms=18 coulombs).

Figure 6:
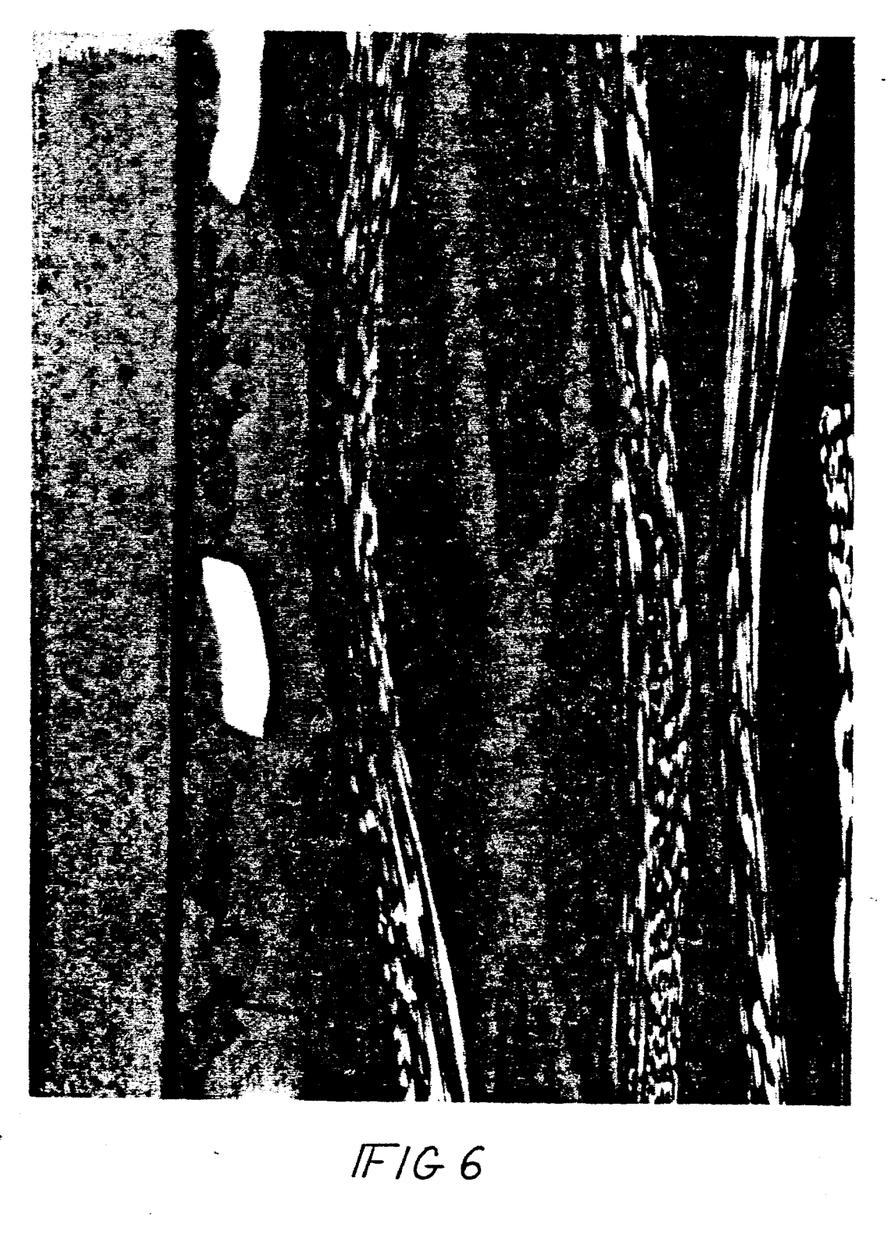
FIG. 6 is a photomicrograph of a composite structure not of the subject invention having a lightning strike screen adhesively bonded (co-cured) to a layup of three plies of carbon/graphite epoxy resin impregnated fabric showing presence of hard resin pockets in the adhesive layer.
Figure 7:
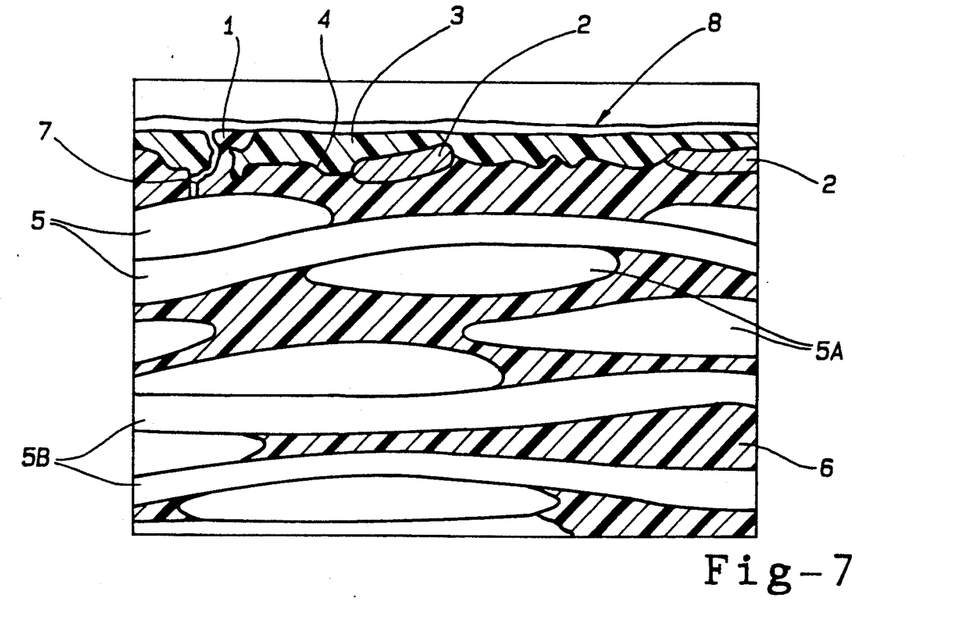
FIG. 7 is a line drawing (schematic) of the photomicrograph of FIG. 6.
Figure 8:
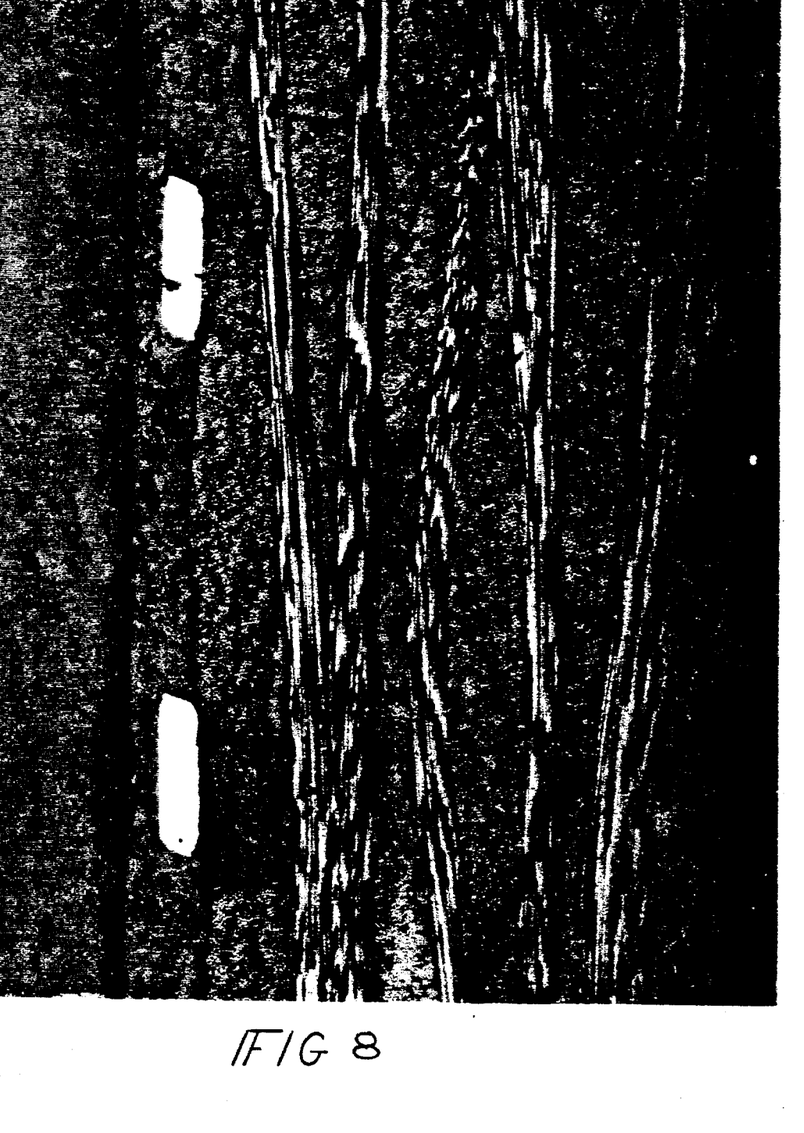
FIG. 8 is a photomicrograph of a composite structure in accordance with the subject invention.

The presence of hard resin pockets in the composite's adhesive layer can be assessed by visual inspection of the composite surface as well as by microscopic examination of a composite cross-section. Because the panels contain carbon/graphite fibers, the hard resin pockets present a "window" on the composite surface through which the black fibers may be seen. The surface, though smooth and continuous, appears to be punctured with numerous black holes. For microscopic examination, a cross-section of the composite is polished and observed using ordinary light microscopy or phase contrast microscopy. The boundary between the adhesive layer and the prepreg matrix resin may be detected. Hard resin pockets may be seen as matrix resin penetrating upwards through the adhesive layer. FIG. 6 is a photomicrograph of panel not of the subject invention in which hard pockets of resin form. FIG. 7 is a schematic of the photograph wherein the hard pocket (1) is identified. The screen (2) is embedded completely within the adhesive layer (3). The adhesive/matrix resin interface is at (4). The carbon fiber tows (5) may also clearly be discerned. The ellipsoidal domains (5A) are fiber tows running perpendicular to the plane of the cross-section, while the long domains (5B) are fiber tows in the same plane as the cross-section. The matrix resin (6) may be seen in the areas between the tows. At (7) is seen a microcrack emanating from the area neighboring the hard resin pocket. The panels are generally tested for lightning strike resistance after painting; the paint layer is the dark area (8). FIG. 8 is a photomicrograph of an adhesive/matrix resin combination within the scope of the subject application. No resin pockets and no microcracks are visible.

Thermal cycling tests were performed by heating 12×12 inch (30×30 cm) 3 ply epoxy/carbon fiber fabric prepregs cocured with the adhesive/screen combination from −65° F. to 177° F. at a 10° F./minute ramp with a 10 minute hold at maximum and minimum temperatures. Every 400 cycles, the composites were examined for microcracks using 30x optical microscopy. Before the next round of thermal cycling, the panels were subjected to 24 hours of salt spray exposure. All panels were subjected to Zone 1A and Zone 2A tests, and all panels passed with no trough-puncture of the three layer panel. Surface damage was evident on all panels which was to be expected.

where D is the diffusion coefficient, $T_a$ is the dwell time of the adhesive resin at minimum viscosity $V_a$ is the minimum viscosity of the adhesive resin, $T_p$ is the dwell time of the prepreg matrix resin at minimum viscosity, and $V_p$ is the minimum viscosity of the prepreg matrix resin, $T_a$, $V_a$, $T_p$ and $V_p$ having been determined from the viscosity profile of the respective resin during cure at the same temperature/time ramp of 1°-2° C./min, and wherein D=0.1 when $T_a^{1.5}/V_a<0.3$; or where irrespective of D, $T_a^{1.5}/V_a<0.3$.

2. The combination as claimed in claim 1 wherein said

TABLE 1

| Adhesive | $V_a$ (Poise) | $T_a$ (min) | Prepreg Matrix Resin | $V_p$ | $T_p$ | Microcrack Development After # Cycles | Resin Pockets | Apparent Surface Quality |
|---|---|---|---|---|---|---|---|---|
| 1[1] | 1000 | 37 | a[2] | 4 | 34 | >3000 | None | Excellent |
| 1 | 1000 | 37 | b[3] | 80 | 10 | >1200 | None | Excellent |
| 1 | 1000 | 37 | c[4] | 353 | 20 | >1200 | None | Excellent |
| 2[5] | 150 | 16 | a | 4 | 34 | —[6] | Numerous | Poor |
| 2 | 150 | 16 | b | 80 | 10 | —[7] | None | Excellent |
| 2 | 150 | 16 | c | 353 | 20 | —[7] | None | Excellent |
| 3[8] | 600 | 70 | a | 4 | 34 | 100 | Numerous | Poor |
| 3 | 600 | 70 | b | 80 | 10 | 800 | Some | Fair |
| 3 | 600 | 70 | c | 353 | 20 | ? | None | Excellent |

[1] METLBOND ® 1515-3 film adhesive
[2] RIGIDITE ® 5239 epoxy resin prepreg
[3] RIGIDITE ® 5225 epoxy resin prepreg
[4] RIGIDITE ® 5255-4 bismaleimide resin prepreg
[5] METLBOND ® 1146LH film adhesive
[6] Results not available, expected less than 1000 cycles
[7] Results not available, expected greater than 1200 cycles
[8] FM300 film adhesive (American Cyanamid)

I claim:

1. A fiber-reinforced thermosetting matrix resin prepreg/film adhesive/metal screen combination suitable for co-curing into lightning strike protected fiber-reinforced thermoset composite structures, comprising:
   a) one or more plies of a fiber-reinforced prepreg impregnated with a thermosettable matrix resin sufficient to prepare a composite structure of a desired thickness;
   b) a conductive metal screen having a nominal thickness of from 1 mil to 10 mils; and
   c) a thermosettable film adhesive;
wherein the diffusion coefficient of the thermosettable prepreg matrix resin into the film adhesive satisfies the equation $$D < [T_a]^{1.5}/V_a \cdot [T_p/V_p]$$

adhesive resin has a minimum viscosity of 800 and a dwell time at minimum viscosity of less than 40 minutes.

3. The combination of claim 1, further characterized in that following layup and cure of components a), b), and c) into a composite assembly, said assembly develops substantially no microcracks after in excess of 1000 thermal cycles.

4. The composite assembly of claim 1 wherein the thermoset adhesive has a minimum viscosity of greater than 400 poise when measured over a temperature range of 1°-2° C./min and wherein the areal weight of the adhesive film prior to cure is about 0.05 lb/ft³ or more.

5. The combination of claim 2, further characterized in that following layup and cure of components a), b), and c) into a composite assembly, said assembly develops substantially no microcracks after in excess of 1000 thermal cycles.

* * * * *